(12) United States Patent
Akin et al.

(10) Patent No.: US 12,378,091 B2
(45) Date of Patent: Aug. 5, 2025

(54) APPLICATION DEVICE HAVING A HELIX FEED, ROBOT DEVICE AND PRODUCTION SYSTEM

(71) Applicant: tesa SE, Norderstedt (DE)

(72) Inventors: Deniz Nick Akin, Hamburg (DE); Thomas Gerdsmann, Hamburg (DE); Peter Himmelsbach, Buxtehude (DE); Marten Rohde, Bienenbüttel (DE); Tristan Wienzek, Barsbüttel (DE)

(73) Assignee: tesa SE, Norderstedt (DE)

( * ) Notice: Subject to any disclaimer, the term of this patent is extended or adjusted under 35 U.S.C. 154(b) by 133 days.

(21) Appl. No.: 18/571,163

(22) PCT Filed: Jun. 15, 2022

(86) PCT No.: PCT/EP2022/066371
§ 371 (c)(1),
(2) Date: Dec. 15, 2023

(87) PCT Pub. No.: WO2022/263547
PCT Pub. Date: Dec. 22, 2022

(65) Prior Publication Data
US 2024/0286273 A1    Aug. 29, 2024

(30) Foreign Application Priority Data

Jun. 16, 2021    (DE) .......................... 102021206171.0

(51) Int. Cl.
*B65H 37/00*        (2006.01)
*B25J 9/00*         (2006.01)
(Continued)

(52) U.S. Cl.
CPC .......... *B65H 37/002* (2013.01); *B25J 9/0087* (2013.01); *B25J 9/1664* (2013.01);
(Continued)

(58) Field of Classification Search
CPC ...... B25J 9/0087; B25J 9/1664; B25J 11/005; B65H 35/0013; B65H 37/002; B65H 2555/30; B65H 2701/194
See application file for complete search history.

(56) References Cited

U.S. PATENT DOCUMENTS

| | | | |
|---|---|---|---|
| 2002/0124967 A1* | 9/2002 | Sharp ................. | B65H 35/0013 156/496 |
| 2005/0016671 A1* | 1/2005 | Sharp ................. | B65H 35/0013 156/577 |

(Continued)

FOREIGN PATENT DOCUMENTS

| | | |
|---|---|---|
| DE | 4040749 C2 | 12/1995 |
| DE | 102016226058 A1 | 6/2018 |

(Continued)

OTHER PUBLICATIONS

German Patent & Trademark Office, Office Action, German Patent Application No. 102021206171.0, Feb. 14, 2022, 3 pages.

*Primary Examiner* — Dale Moyer
(74) *Attorney, Agent, or Firm* — Price Heneveld LLP

(57) ABSTRACT

An application apparatus that includes: a base unit comprising a first end, a second end, and a connection device that extends along a base unit axis from the first end to the second end; an application unit securely coupled to the second end, wherein the application unit is configured to apply a strip to a workpiece; and a redirection unit pivotably coupled to the base unit. The application unit comprises a first input guiding element configured to supply the strip to the application unit. The redirection unit is configured such that the strip can wrap around the redirection unit and be guided from an axial receiving position to an axial discharge position, wherein the axial receiving position is spaced apart from the axial discharge position in an axial direction of the (Continued)

axis. The first input guiding element of the application unit is spaced apart from the axial receiving position.

19 Claims, 9 Drawing Sheets

(51) Int. Cl.
    *B25J 9/16*         (2006.01)
    *B25J 11/00*      (2006.01)
    *B65H 35/00*     (2006.01)

(52) U.S. Cl.
    CPC ........ B25J 11/005 (2013.01); B65H 35/0013 (2013.01); *B65H 2555/30* (2013.01); *B65H 2701/194* (2013.01)

(56) References Cited

U.S. PATENT DOCUMENTS

| | | | |
|---|---|---|---|
| 2006/0054272 A1* | 3/2006 | Panetta | B65H 35/0013 156/64 |
| 2019/0070732 A1 | 3/2019 | Chen et al. | |
| 2022/0388805 A1* | 12/2022 | Lalonde | B65H 59/36 |

FOREIGN PATENT DOCUMENTS

| | | |
|---|---|---|
| DE | 102018200439 A1 | 7/2019 |
| EP | 2928802 A1 | 10/2015 |
| WO | 2021087622 A1 | 5/2021 |

* cited by examiner

APPLICATION DEVICE HAVING A HELIX FEED, ROBOT DEVICE AND PRODUCTION SYSTEM

CROSS-REFERENCE TO RELATED APPLICATIONS

This application is a U.S. national stage application under 35 U.S.C. § 371 that claims the benefit of priority under 35 U.S.C. § 365 of International Patent Application No. PCT/EP2022/066371, filed on Jun. 15, 2022, designating the United States of America, which in turn claims the benefit of priority under 35 U.S.C. §§ 119, 365 of German Patent Application No. 102021206171.0, filed Jun. 16, 2021, the contents of which are relied upon and incorporated herein by reference in their entirety.

FIELD OF THE DISCLOSURE

The present invention relates to an application apparatus, a robot apparatus and a production system.

BACKGROUND

Application apparatus are known from the prior art. The application apparatus have an application unit which is configured to apply a strip to a workpiece. Often, the application unit has an input guiding element via which the strip can be supplied to the application unit.

Generally, it is desirable in these application apparatus to provide the largest possible amount of strip material which can be used in one piece and without any manual intervention during the application of the strip. In principle, it is possible to provide the entire strip material directly at the application apparatus. In the event that the application apparatus is moved by means of a robot arm of a robot apparatus, however, the quantity of the strip material which is provided directly at the application apparatus is limited by its weight since, as the weight which has to be transported by the robot arm increases, the precision when applying the strip to the workpiece decreases and the spatial requirement of a robot apparatus having a robot arm which has to transport a high weight increases. Furthermore, it is in principle possible to provide the strip material by means of a strip dispenser which is placed on a floor of a production hall and which is not moved together with the application apparatus over the workpiece. In this instance, the geometry of the paths along which the strip can be applied to the workpiece is very limited, particularly when the entire strip material is intended to be applied in one piece and without any manual intervention on the workpiece.

EP 2 928 802 A1 discloses a system for supplying material to a feed machine which can be loaded with a material coil on a plurality of material drives in each case. From these, material can then be conveyed from the respective material coil via a respective strip path to a supply of the feed machine. The disadvantage with this type of supply is, in addition to the complexity thereof and size of the supply system, the sub-division into an active zone and a maintenance zone into which the plurality of material drives can be moved in order to enable access for workers for new loading operations.

DE102018200439A1 discloses an applicator for punched components having a punched component strip in which punched components are arranged along a retention belt. The punched component strip is guided over a stamp head and the punched components are pressed onto a surface by means of the stamp. The disadvantage of this is that the punched component roll and one or more winding rollers are secured to the stamp head and are also carried during the movement of the stamp head. This increases the weight which has to be moved by the robot arm, and consequently also the moments of inertia, and additionally makes it necessary to change the punched component roller and the winding roller.

An object of the present invention is to apply the entire strip material of a strip to a workpiece in one piece and without any manual intervention in a precise and space-saving manner along paths with free geometry.

BRIEF SUMMARY OF THE DISCLOSURE

According to a first aspect of the invention, the object mentioned is achieved with an application apparatus. The application apparatus has a base unit. The base unit has at a first end a connection device for a production system. The base unit extends along an axis from the first end to a second end remote from the connection device. The application apparatus has an application unit. The application unit is configured to apply a strip, preferably an adhesive strip, to a workpiece. The application unit is securely coupled to the base unit at the second end of the base unit. The application apparatus has a redirection unit. The redirection unit is coupled to the base unit so as to be able to be pivoted about the axis. The application unit has a first input guiding element. Via the first input guiding element, the strip can be supplied to the application unit. The redirection unit is configured in such a manner that the strip can wrap around the redirection unit in such a manner that, when it is guided thereby from an axial receiving position, at which it moves into abutment with the redirection unit, to an axial discharge position, in which it is released from the redirection unit, the axial receiving position is spaced apart from the axial discharge position in an axial direction of the axis. The first input guiding element of the application unit is spaced apart from the axial receiving position in an axial direction of the axis.

The application apparatus has the base unit. The base unit forms a portion of the application apparatus. The base unit has at the first end the connection device for the production system. The connection device may be configured to be connected to a robot arm of a robot apparatus. The application apparatus can be moved by means of the robot arm over the workpiece. The base unit extends along the axis from the first end to the second end remote from the connection device.

The application apparatus has an application unit. The application unit forms a portion of the application apparatus. The application unit is configured to apply a strip, preferably an adhesive strip, to a workpiece. The strip may be an adhesive strip. Preferably, the strip is a dual-sided adhesive strip, wherein the strip has in each case at two opposing sides an adhesive surface. In a further preferred manner, the strip is a single-sided adhesive strip, wherein the strip has on one side an adhesive surface and at the side opposite this side a non-adhesive surface. The strip may be a portion of a strip assembly. The strip assembly may have the strip and a carrier, which are connected to each other. In order to apply the strip to the workpiece, the strip can be released from the carrier. The strip can be connected to the carrier with the side which has an adhesive surface. When the strip and the carrier are detached from each other, the adhesive surface by means of which the strip can be applied to the workpiece can be released. In particular, there is provision for the strip and the carrier to be connected to each other as far as the portion of the strip assembly on which the strip is released from the carrier in order to apply the strip to the workpiece. In this instance, the strip assembly can be guided by the application apparatus in a direction and, when viewed in this direction, from the point at which the strip is released from the carrier, the carrier alone can be guided, without the strip, by the application apparatus.

The application unit is securely coupled to the base unit at the second end of the base unit. The fixed coupling between the base unit and the application unit ensures that the application unit follows a movement of the base unit. Particularly when the base unit is moved by means of the robot arm of the robot apparatus, the application unit follows this movement so that the strip can be applied to the workpiece along a path which is defined by the movement of the base unit. In particular, the fixed coupling between the base unit and the application unit ensures that, when the base unit is pivoted about the axis, the application unit is pivoted together with the base unit about the axis. The fixed coupling of the base unit and the application unit is provided at the second end of the base unit. For the fixed coupling between the base unit and the application unit, there may be provided at the second end of the base unit a coupling element which extends away from the axis to a free end to which the application unit is fitted. In particular for the fixed coupling between the base unit and the application unit, there may also be provided at the second end of the base unit two or more than two coupling elements which extend away from the axis to a free end to which the application unit is fitted.

The application apparatus has a redirection unit. The redirection unit forms a portion of the application apparatus. The redirection unit is coupled to the base unit so as to be able to be pivoted about the axis. This pivotable coupling between the base unit and the redirection unit ensures that, when the base unit and consequently also the application unit are pivoted about the axis, the redirection unit is not pivoted about the axis relative to the environment of the application apparatus, or at least can be pivoted about the axis irrespective of the pivot movement of the base unit and the application unit. Particularly when the application apparatus is moved by means of the robot arm of the robot apparatus, the redirection unit follows this movement in the sense that the position of the redirection unit is changed together with the position of the base unit and the position of the application unit, but the orientation of the redirection unit can change irrespective of the orientation of the base unit and the orientation of the application unit. In particular in the event of a change of the orientation of the base unit and a change of the orientation of the application unit, the orientation of the redirection unit does not necessarily have to change. When the strip is now applied to the workpiece, it may be necessary for the application unit to change its orientation, for example, when the path along which the strip is applied to the workpiece forms a self-contained path, such as, for example a rectangular path or a circular path. As a result of the fact that the redirection unit is coupled to the base unit so as to be able to be pivoted about the axis, during the movement of the application unit in order to form the closed path, the redirection unit can keep its orientation with particular respect to a strip dispenser, which is placed on a floor of a production hall, constant or change it only minimally. As a result of the fact that the redirection unit can keep its orientation with respect to the strip dispenser constant or change it only minimally, it is ensured that the strip can be guided in such a manner that it can always be received by the redirection unit during the entire movement of the application unit in order to form the closed path in the same portion of the redirection unit. In particular, the strip can, irrespective of the position and orientation of the application unit, be received in the same portion of the redirection unit. This applies to any conceivable form of the path, along which the strip is applied to the workpiece. The pivotable coupling between the base unit and the redirection unit ensures that the strip can be applied to the workpiece along paths with a free geometry.

The application unit has a first input guiding element. The strip can be supplied via the first input guiding element of the application unit. The first input guiding element may have one or more first redirection rollers which are rotatably supported about the rotation axis thereof. In particular, the first input guiding element may have four first redirection rollers. The four first redirection rollers may be arranged in such a manner that a projection of the rotation axes onto a plane which is arranged perpendicularly to the path of the strip forms a square. Alternatively, the first input guiding element may have three first redirection rollers. The three first redirection rollers may be arranged in such a manner that a projection of the rotation axes onto a plane which is arranged perpendicularly to the path of the strip forms a triangle. Preferably, the strip is guided by means of the first redirection rollers in such a manner that a movement of the strip in each direction perpendicular to the guiding direction of the strip is limited by a first redirection roller. The first redirection rollers which are arranged in this manner consequently ensure a secure and reliable guiding of the strip. The use of first redirection rollers is particularly advantageous since the first redirection rollers can in the event of contact with the strip roll thereon and consequently friction losses as a result of friction between the strip and the application unit can be minimized.

The redirection unit is configured in such a manner that the strip can wrap around the redirection unit in such a manner that, when it is guided thereby from the axial receiving position, at which it comes to bear against the redirection unit, to the axial discharge position, at which it is released from the redirection unit, the axial receiving position is spaced apart from the axial discharge position in an axial direction of the axis. The strip can thus wrap around the redirection unit in such a manner that the strip comes to bear against the axial receiving position with the redirection unit. Preferably, the strip moves into abutment with a third redirection roller of the redirection unit. The abutment of the strip against the redirection unit defines the axial receiving position. Furthermore, the strip can wrap around the redirection unit in such a manner that the strip is released from the redirection unit at the axial discharge position. The location at which the strip is released from the redirection unit defines the axial discharge position. Preferably, the strip is released from a third redirection roller of the redirection unit. The strip is guided via the redirection unit from the axial receiving position to the axial discharge position. When viewed in the guiding direction, in which the strip is guided around the redirection unit, portions of the strip first pass the axial receiving position and subsequently the axial discharge position. The axial receiving position is spaced apart from the axial discharge position in an axial direction of the axis. The spacing of the axial receiving position from the axial discharge position in an axial direction of the axis ensures that, in the event of a movement of the application unit, the portion of the strip between the strip dispenser and the axial receiving position does not touch the portion of the strip between the axial discharge position and the application unit. Preferably, the strip can wrap around the redirection unit partially or at least once completely. An arrangement in which the redirection unit is completely wrapped around by the strip may be produced when a straight line which extends parallel with the axis intersects the axial receiving position and the axial discharge position and in this instance intersects the strip only at the axial receiving position and the axial discharge position. An arrangement in which the redirection unit is twice completely wrapped around by the strip may also be produced when the straight line which extends parallel with the axis intersects the axial receiving position and the axial discharge position and in this instance the strip both at the axial receiving position and at the axial discharge position and in addition, the strip between the axial receiving position and axial discharge position. In a similar manner, a three-fold, four-fold, five-fold, etc., wrapping around arrangement of the redirection unit by the strip may be defined.

The first input guiding element of the application unit is spaced apart from the axial receiving position in an axial direction of the axis. The spacing of the first input guiding element from the axial receiving position in an axial direction of the axis ensures that, when the application unit is pivoted relative to the redirection unit, the axial discharge position can change in an axial direction, but the axial discharge position in this instance maintains an axial spacing from the axial receiving position.

In summary, it can thus be said that it is possible with the application apparatus according to the invention to provide as much strip material as possible which can be used in one piece and without any manual intervention during the application of the strip. In this instance, it is not necessary to provide the entire strip material directly at the application apparatus and the entire strip material does not have to be moved using a robot arm of a robot apparatus together with the application apparatus so that a high level of precision when applying the strip to the workpiece is ensured and the spatial requirement of the robot apparatus with the robot arm can be kept small. Instead, there may be provision for the strip material to be provided by means of a strip dispenser which is placed on a floor of a production hall. In this instance, however, the geometry of the paths along which the strip can be applied to the workpiece is not limited, particularly when the entire strip material is intended to be applied to the workpiece in one piece and without any manual intervention. Accordingly, the entire strip material of a strip can be applied to a workpiece in one piece and without any manual intervention in a precise and space-saving manner along paths with a free geometry.

In one embodiment, the redirection unit has a crown-like element and at least two redirection rollers, wherein each redirection roller of the at least two redirection rollers is rotatably supported on the crown-like element and has a circumferential outer face, by means of which the redirection roller can roll when the strip is guided on a portion of the strip. The crown-like element is crown-like and can as a result of its crown-like shape at least partially surround the base unit. The crown-like element may also be referred to as a first crown-like element. The redirection unit may have a second crown-like element. The second crown-like element is crown-like and may as a result of its crown-like shape at least partially surround the base unit. The redirection unit has the at least two redirection rollers. In particular, the redirection unit may have two, three or four redirection rollers. Each redirection roller of the redirection unit may also be referred to as a third redirection roller. Each third redirection roller may either be rotatably supported on the first crown-like element or both on the first crown-like element and on the second crown-like element. When the first crown-like element is provided, the first crown-like element as a result of its crown-like shape can ensure that the third redirection rollers can be arranged with uniform spacing from each other around the base unit. When the second crown-like element is provided, the second crown-like element as a result of its crown-like form can ensure that the third redirection rollers can be arranged with uniform spacing from each other around the base unit. Particularly when both the first crown-like element and the second crown-like element are provided, the third redirection rollers may be connected at both ends thereof to the first crown-like element and to the second crown-like element so that the third redirection rollers are secured in a particularly mechanically robust manner inside the redirection unit. Each third redirection roller has a circumferential outer face by means of which the third redirection roller can roll when the strip is guided on a portion of the strip. The use of third redirection rollers is particularly advantageous since the third redirection rollers when in contact with the strip can thereby roll thereon and consequently friction losses as a result of friction between the strip and the redirection unit can be minimized.

In one embodiment, the rotation axis of each redirection roller of the redirection rollers extends obliquely relative to the axis. An extent of the rotation axes obliquely with respect to the axis is a particularly simple way for the strip to be able to wrap around the redirection unit and, even when the strip wraps around the redirection unit once completely, it does not come into contact with itself. Furthermore, an extent of the rotation axes obliquely relative to the axis ensures that the strip, when it wraps around the redirection unit, does not slide down off it.

In one embodiment, the rotation axis of each redirection roller of the redirection rollers in each case forms an angle of from 1° to 20° with a straight line which extends parallel with the axis. It has been found to be advantageous, in particular in connection with four third redirection rollers, that conventional strips at an angle of from 1° to 20°, when these strips wrap around the redirection unit at least once completely, do not come into contact with each other.

In one embodiment, the position of the rotation axis of each redirection roller of the redirection rollers can be adjusted with respect to the axis. The adjustable rotation axes of the redirection rollers ensure that strips with different geometries can be used. In particular, particularly depending on the width of a strip, the rotation axes of the redirection rollers can be adjusted in such a manner that the strip does not touch itself when the strip wraps around the redirection unit at least once completely.

In one embodiment, the redirection unit has a second input guiding element and a pivot arm which extends from the first end thereof to the second end thereof away from the axis, wherein at the second end the second input guiding element via which the strip can be supplied to the redirection unit is fitted. The second input guiding element may have at least a fourth redirection roller. Preferably, each fourth redirection roller is rotatably supported about the rotation axis thereof. In particular, there is provision for the second input guiding element to have four fourth redirection rollers. The four fourth redirection rollers may be arranged in such a manner that a projection of the rotation axes onto a plane which is arranged perpendicularly to the path of the strip forms a square. Alternatively, the second input guiding element may have three fourth redirection rollers. The three fourth redirection rollers may be arranged in such a manner that a projection of the rotation axes onto a plane which is arranged perpendicularly to the path of the strip forms a triangle. The strip may be guided using the fourth redirection rollers in such a manner that a movement of the strip in each direction perpendicular to the guiding direction of the strip is limited by a fourth redirection roller. The fourth redirection rollers which are arranged in this manner ensure a safe and reliable guiding of the strip. The use of fourth redirection rollers is particularly advantageous since the fourth redirection rollers in the event of contact with the strip can thereby roll thereon and consequently friction losses as a result of friction between the strip and the redirection unit can be minimized.

In one embodiment, the base unit has a recess which extends from the first end of the base unit along the axis to the second end of the base unit. The recess ensures that, for example, cables or hoses which may connect the second end of the robot arm to the application unit can be arranged inside the base unit and are consequently protected by the base unit from effects from the environment of the base unit, for example, from effects resulting from the redirection unit or the strip or other objects which are arranged in the production hall, such as, for example, the strip dispenser, the frame of the robot apparatus, the workpiece or the workpiece rack. The recess consequently ensures in particular that the cables or hoses are mechanically protected by the base unit.

According to a second aspect of the invention, the objective is achieved with a robot apparatus. The robot apparatus has a frame and a robot arm. The robot arm is fitted with the first end thereof to the frame and with the second end thereof to the connection device at the first end of the base unit of the application apparatus according to the first aspect of the invention. At the second end of the robot arm, there is provided an actuator by means of which the base unit can be pivoted about the axis relative to the second end of the robot arm. The features, technical effects and/or advantages described in connection with the application apparatus according to the first aspect of the invention also apply at least in a similar manner to the robot apparatus according to the second aspect of the invention so that at this point corresponding repetition is dispensed with.

According to a third aspect of the invention, the object is achieved by a production system. The production system has a robot apparatus according to the second aspect of the invention. Furthermore, the production system has a strip dispenser having a pretensioning device. When the strip is supplied to the application apparatus, a portion of the strip is pretensioned by the pretensioning device in such a manner that a pretensioning force which is greater than a predetermined pretensioning force threshold acts along the strip. The features, technical effects and/or advantages described in connection with the robot apparatus according to the second aspect of the invention also apply at least in a similar manner to the production system according to the third aspect of the invention so that at this point corresponding repetition is dispensed with.

Other features, advantages and possible applications of the present invention will be appreciated from the following description of the exemplary embodiments and the figures. In this instance, all the features which are described and/or graphically illustrated form individually and in any combination the subject-matter of the invention, even irrespective of their composition in the individual claims or back-references thereof. In the Figures, the same reference numerals further stand for identical or similar objects.

DETAILED DESCRIPTION

Figure 1:
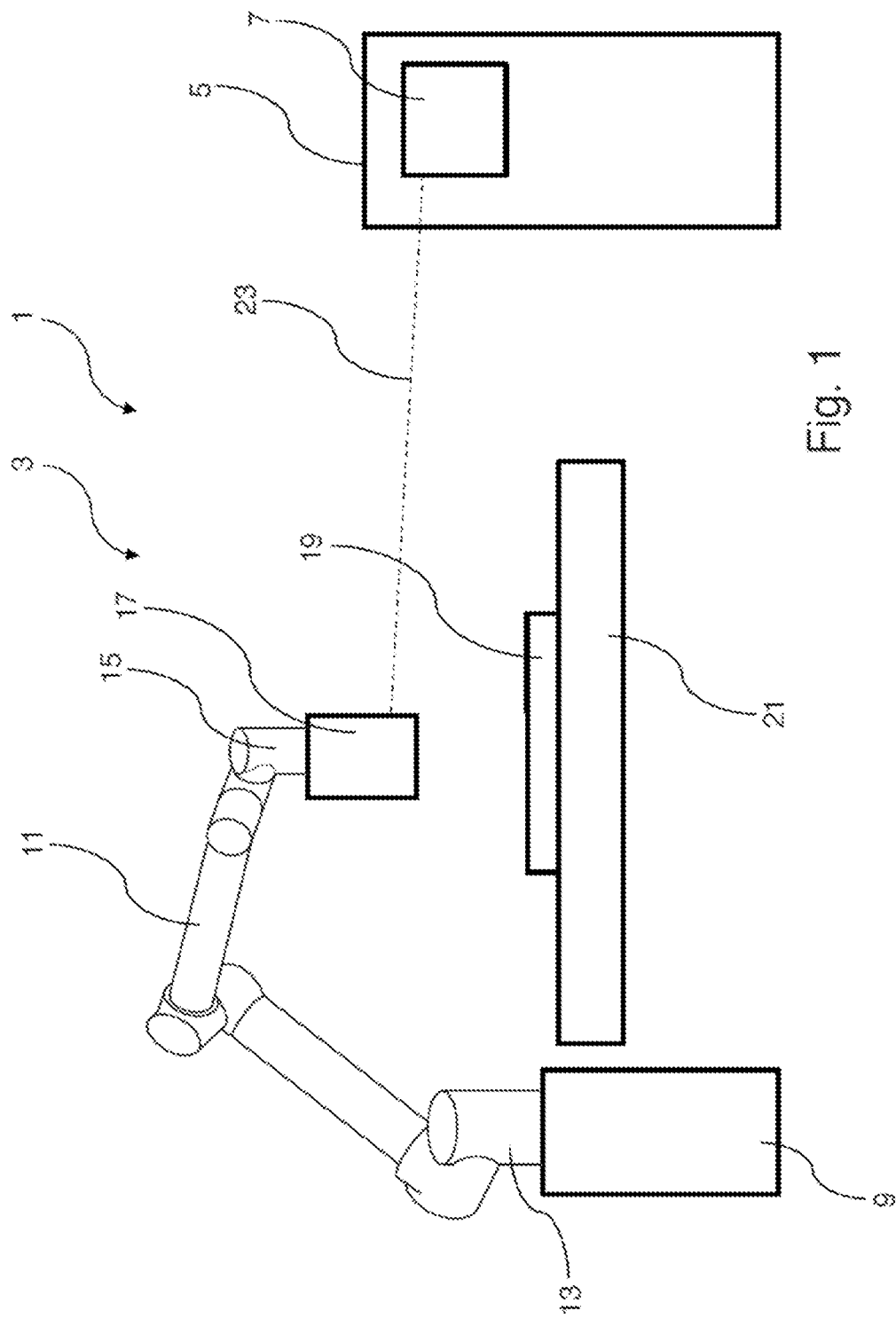
FIG. 1 shows a schematic view of an embodiment of a production system according to the invention.
Figure 2:
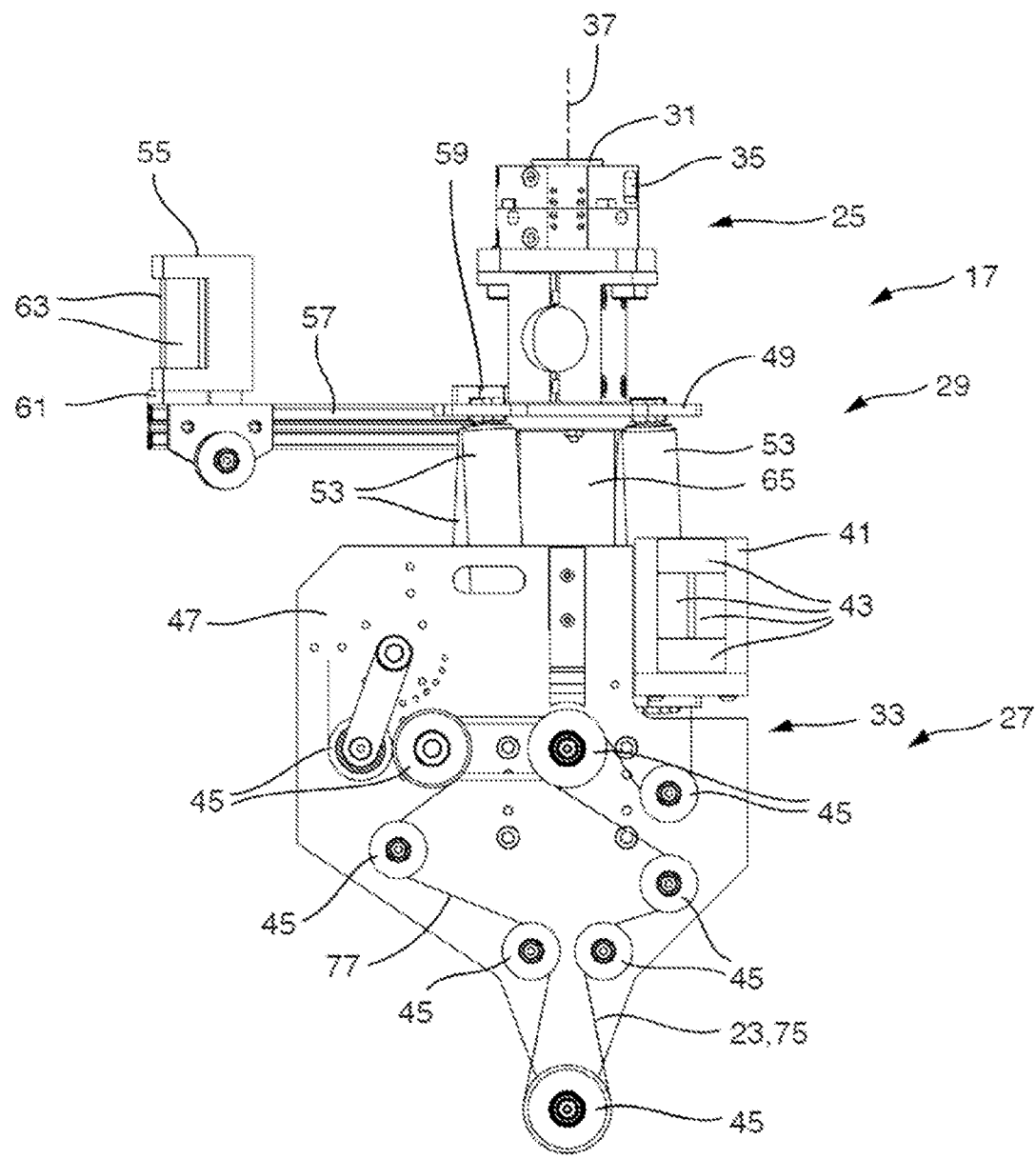
FIGS. 2 to 8 show schematic views of a first embodiment of an application apparatus according to the invention of the production system in FIG. 1.
Figure 3:
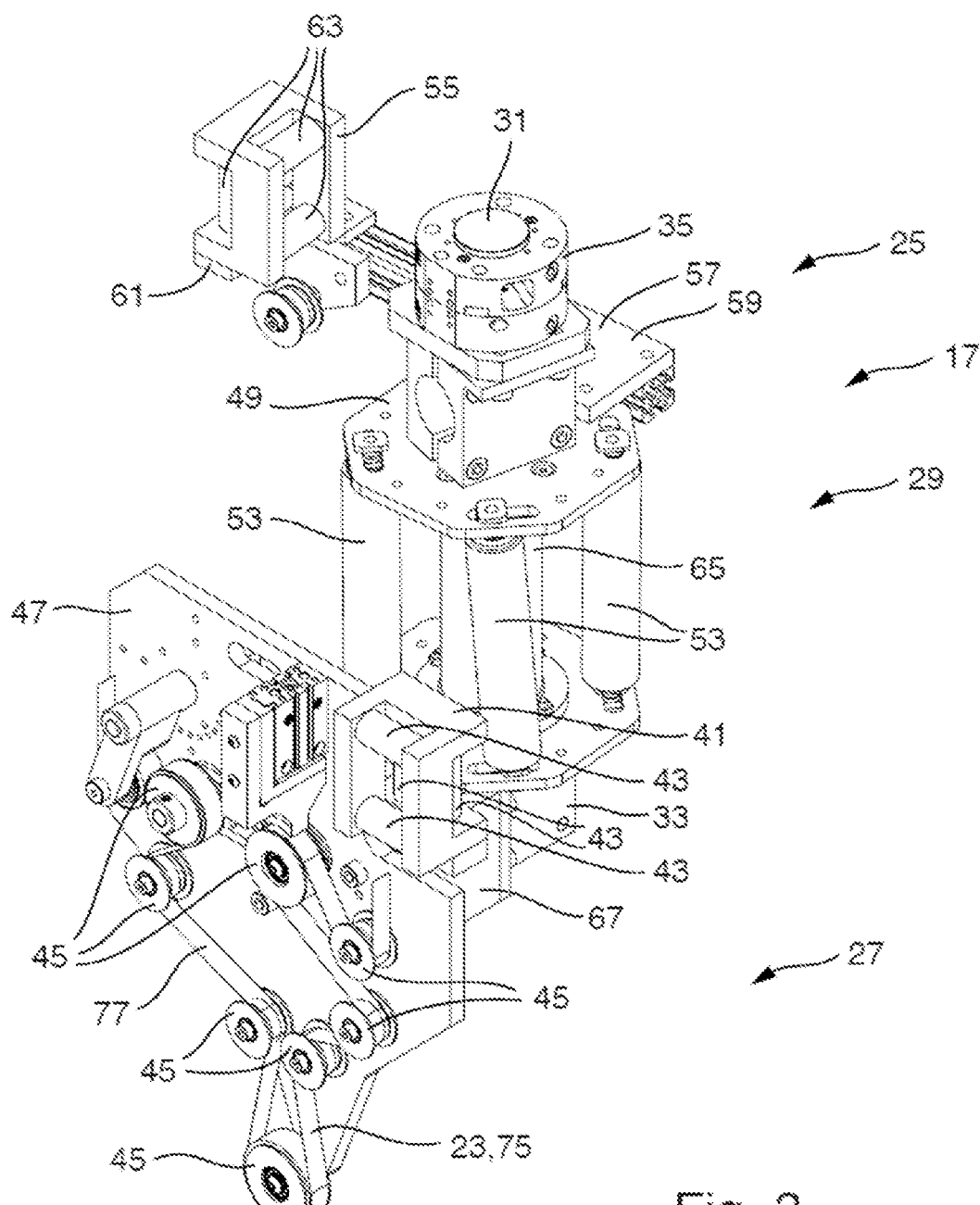
Figure 4:
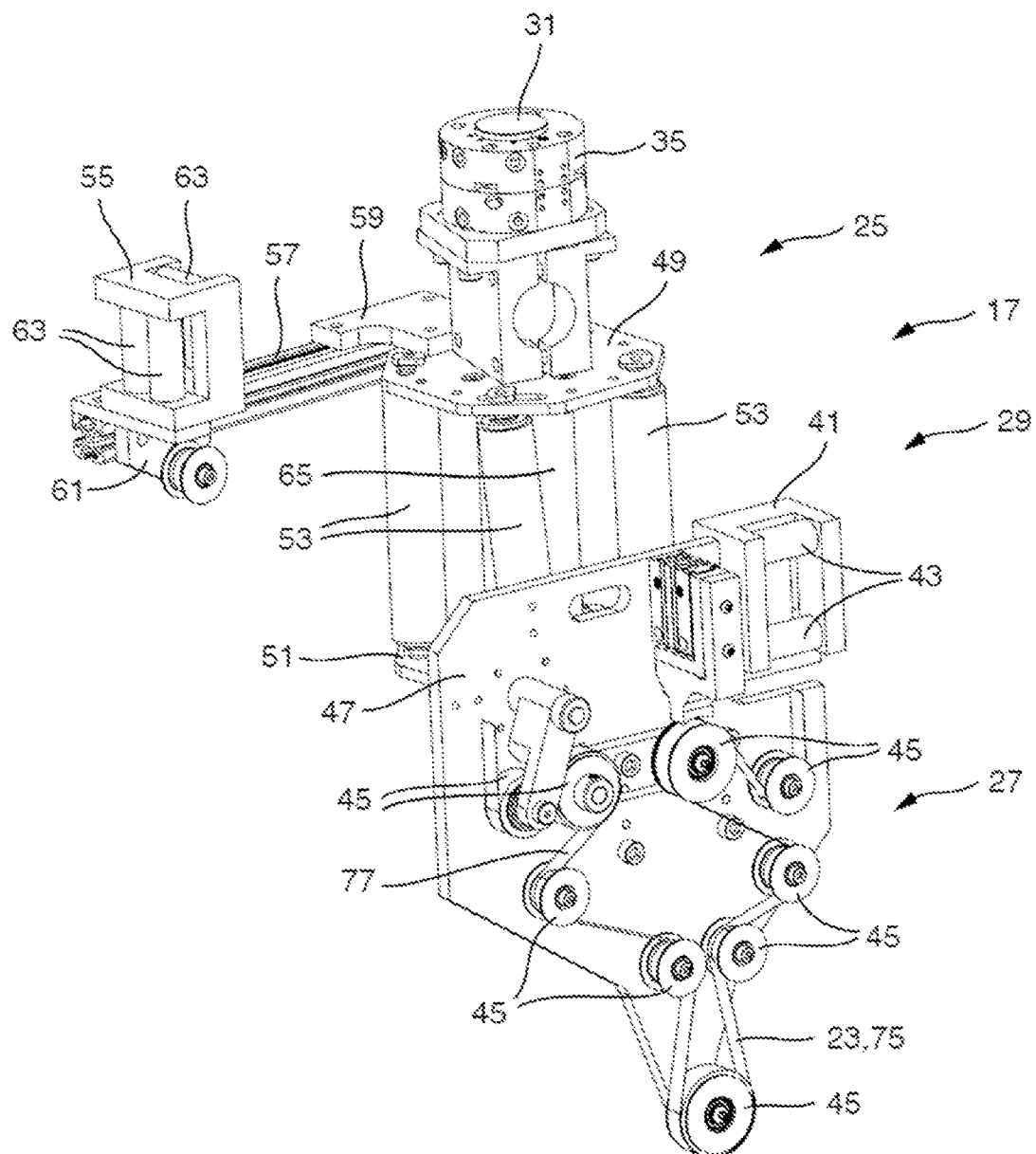
Figure 5:
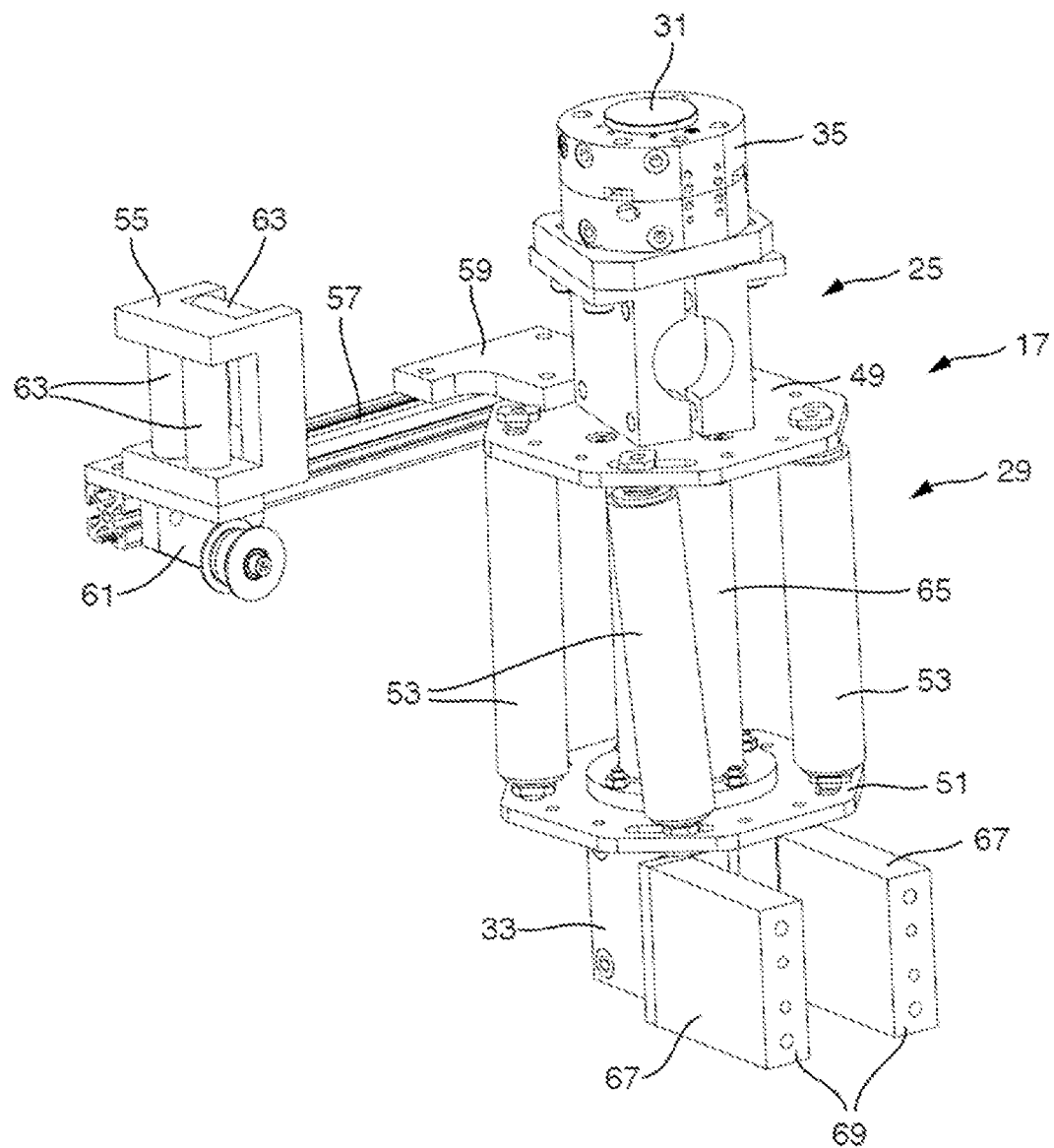
Figure 6:
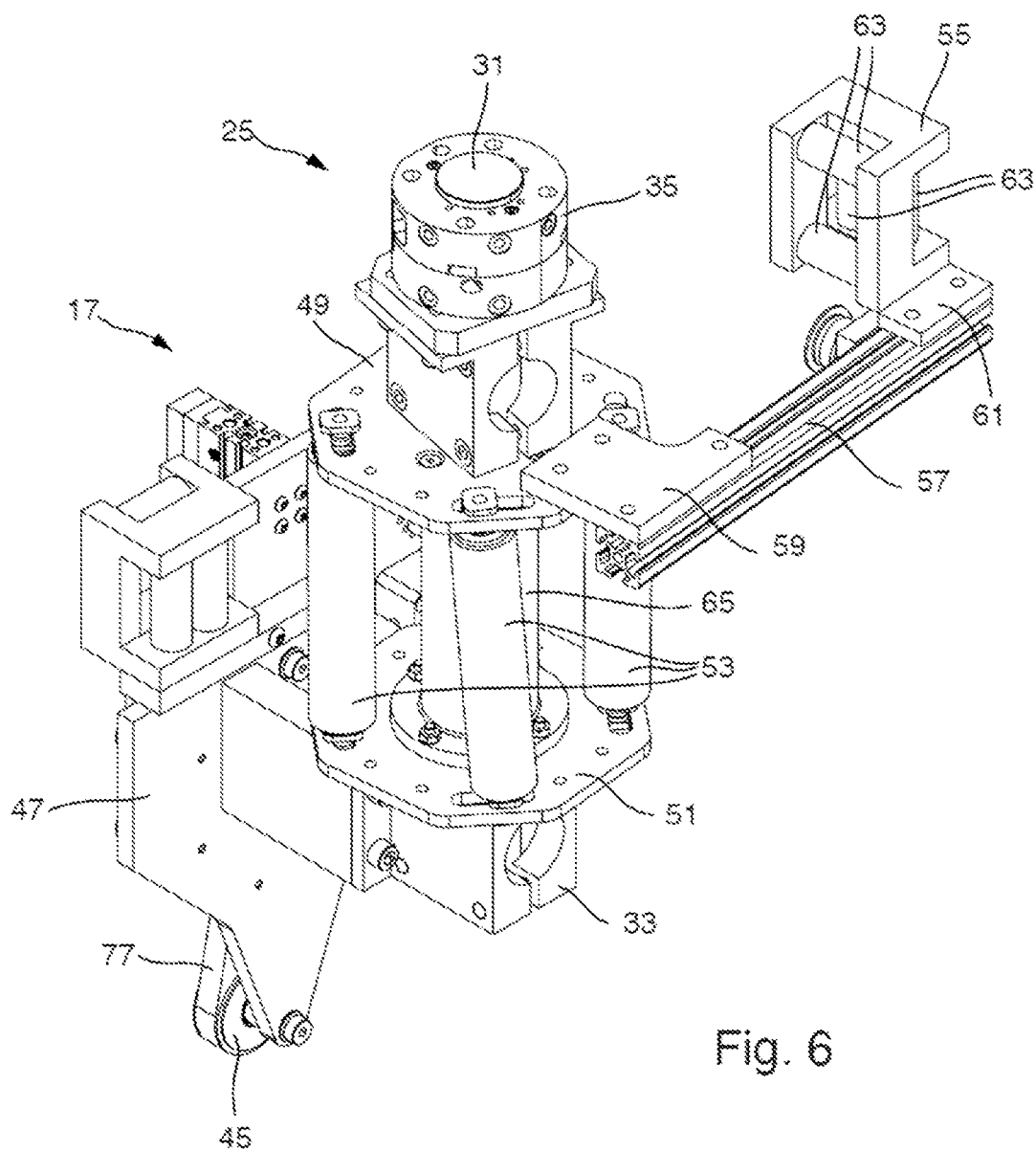
Figure 7:
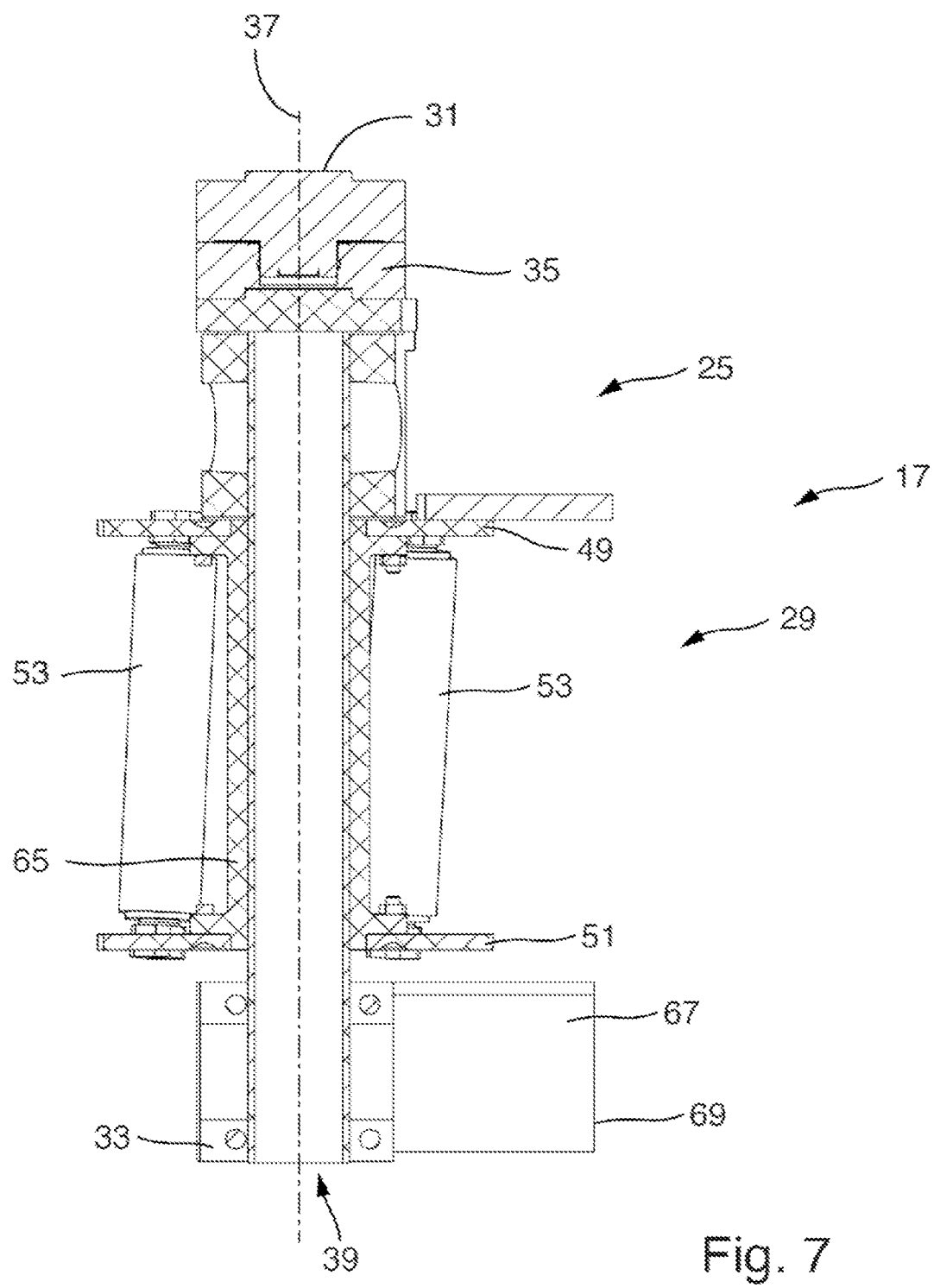
Figure 8:
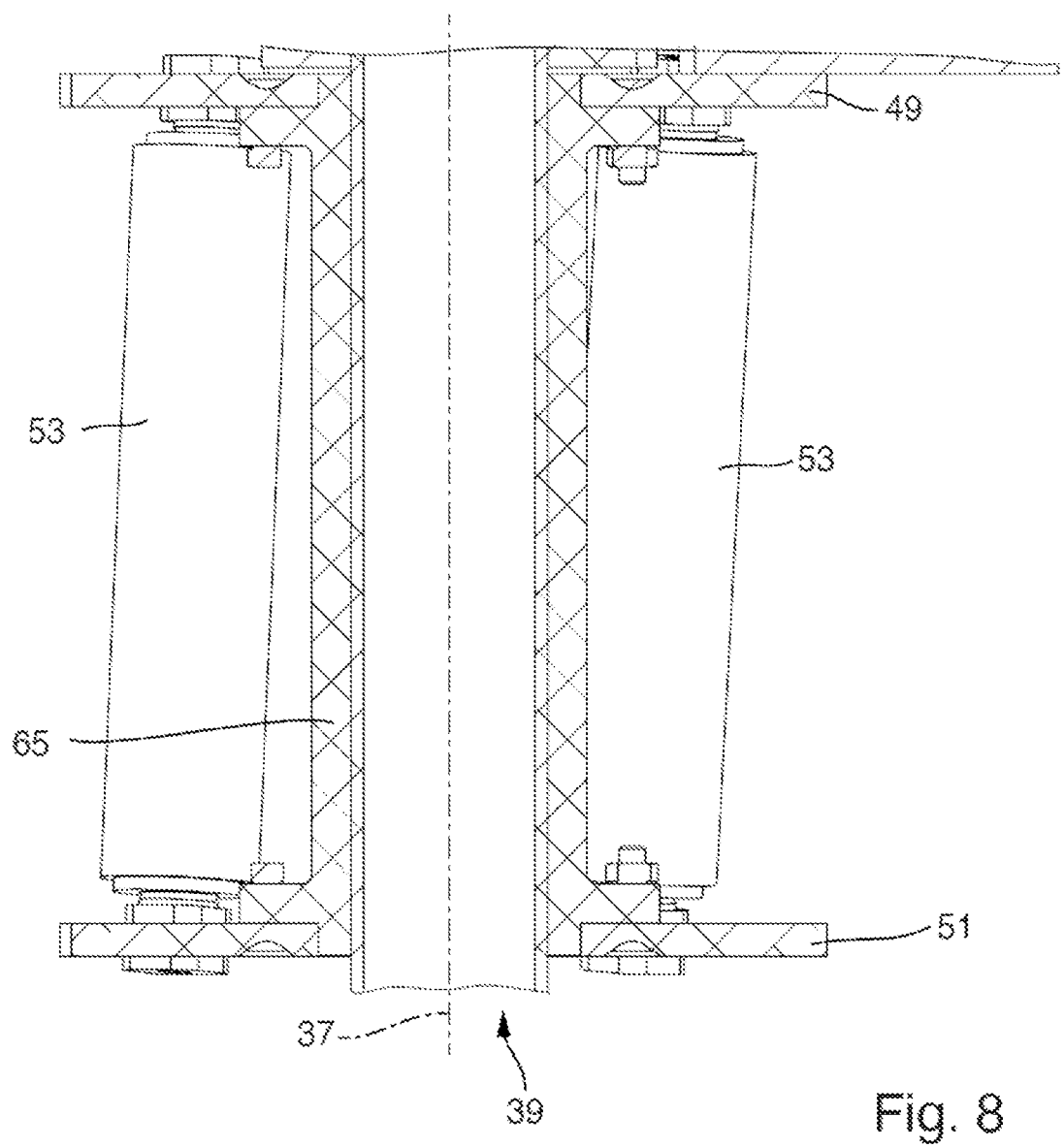

FIG. 1 shows a schematic view of an embodiment of a production system 1 according to the invention. The production system 1 has a robot apparatus 3 and a strip dispenser 5. The strip dispenser 5 has a pretensioning device 7. The strip dispenser 5 may be placed on a floor of a production hall. The robot apparatus 3 has a frame 9 and a robot arm 11. The frame 9 can be placed on the floor of the production hall. The robot arm 11 has a first end 13 and a second end 15. The robot arm 11 is fitted with the first end 13 thereof to the frame 9. With the second end 15 thereof, the robot arm 11 is fitted to an application apparatus 17 of the robot apparatus 3. FIG. 1 shows a workpiece 19. The workpiece 19 is arranged on a workpiece rack 21 which may be arranged on the floor of the production hall. A strip 23 is further illustrated in FIG. 1. For example, the strip 23 may be an adhesive strip. The strip 23 is supplied by the strip dispenser 5 to the application apparatus 17. A portion of the strip 23 is pretensioned by the pretensioning device 7 in such a manner that a pretensioning force which is greater than a predetermined pretensioning force threshold acts along the strip 23. The pretensioning force threshold is preferably selected in such a manner that the pretensioning force which acts along the strip 23 ensures that the strip 23 extends in a straight line between the pretensioning device 7 and the application apparatus 17. The robot arm 11 has a plurality of portions which can be moved relative to each other. Using the portions of the robot arm 11 which can be moved relative to each other, the application apparatus 17 can be moved relative to the workpiece 19. This ensures that the application apparatus 17 can be moved into different positions. In particular, the spacings between the application apparatus 17 and the pretensioning device 7 of the strip dispenser 5 may differ in the different positions of the application apparatus 17. In this instance, the pretensioning device 7 ensures that, in each position of the application apparatus 17, the portion of the strip 23 extends in a straight line between the pretensioning device 7 and the application apparatus 17. In particular, a large number of straight lines are provided, along which the portion of the strip 23 may extend between the pretensioning device 7 and the application apparatus 17, wherein each position of the application apparatus 17 is associated with a straight line from the large number of straight lines.

FIGS. 2 to 8 show schematic views of an embodiment of an application apparatus 17 according to the invention of the production system 1 in FIG. 1. The application apparatus 17 has a base unit 25, an application unit 27 and a redirection unit 29.

The base unit 25 extends from a first end 31 to a second end 33. At the first end 31, the base unit 25 has a connection device 35 of the production system 1. In FIG. 1, the connection device 35 is fitted to the second end 15 of the robot arm 11 illustrated in FIG. 1. At the second end 15 of the robot arm 11 there is provided an actuator by means of which the base unit 25 can be pivoted relative to the second end 15 of the robot arm 11 about an axis 37, along which the base unit 25 extends from the first end 31 to the second end 33 remote from the connection device 35. The base unit 25 has a recess 39 which extends from the first end 31 of the base unit 25 along the axis 37 to the second end 33 of the base unit 25 (see FIGS. 7 and 8). The recess 39 ensures that, for example, cables or hoses which connect the second end 15 of the robot arm 11 to the application unit 27 can be arranged within the base unit 25 and are consequently protected by the base unit 25 from effects from the environment of the base unit 25, for example, from effects resulting from the redirection unit 29 or the strip 23 or other objects which are arranged in the production hall, such as, for example, the strip dispenser 5, the frame 9, the workpiece 19 or the workpiece rack 21. The recess 39 consequently ensures in particular that the cables or hoses are mechanically protected by the base unit 25.

The application unit 27 has a first input guiding element 41. Via the first input guiding element 41, the strip 23 can be supplied to the application unit 27. The first input guiding element 41 has four first redirection rollers 43 which are rotatably supported about the rotation axis thereof. The four first redirection rollers 43 are arranged in such a manner that a projection of the rotation axes onto a plane which is arranged perpendicularly to the path of the strip 23 forms a square. The strip 23 can consequently be guided by the first redirection rollers 43 in such a manner that a movement of the strip 23 in each direction perpendicular to the guiding direction of the strip 23 is limited by a first redirection roller 43. The first redirection rollers 43 which are arranged in this manner consequently ensure a safe and reliable guiding of the strip 23. The use of first redirection rollers 43 is particularly advantageous since the first redirection rollers 43 in the event of contact with the strip 23 can thereby roll thereon and consequently friction losses as a result of friction between the strip 23 and the application unit 27 can be minimized.

Furthermore, the application unit 27 is configured to apply the strip 23 to the workpiece 19. The application unit 27 has second redirection rollers 45 which are rotatably supported about the rotation axis thereof. The second redirection rollers 45 and the first input guiding element 41 are fitted to a plate element 47 of the application unit 27. Using the second redirection rollers 45, the strip 23 can be guided from the first input guiding element 41 to a surface of the workpiece 19 and applied thereto.

The redirection unit 29 has a crown-like element 49. Furthermore, the redirection unit 29 has another crown-like element 51. Furthermore, the redirection unit 29 has four redirection rollers 53. Each redirection roller 53 of the redirection unit 29 can also be referred to as a third redirection roller 53. Each redirection roller 53 of the four redirection rollers 53 is rotatably supported both on the crown-like element 49 and on the additional crown-like element 51. Each redirection roller 53 of the four redirection rollers 53 has a circumferential outer face by means of which the redirection roller 53 can roll when the strip 23 is guided on a portion of the strip 23. The four redirection rollers 53 are arranged in such a manner that the rotation axis of each redirection roller 53 of the redirection rollers 53 extends obliquely with respect to the axis 37. An extent of the rotation axes obliquely with respect to the axis 37 is a particularly simple way for the strip 23 to be able to wrap around the redirection unit 29 and, even when the strip 23 wraps around the redirection unit 29 once completely, it does not come into contact with itself. Furthermore, the four redirection rollers 53 are arranged in such a manner that the rotation axis of each redirection roller 53 of the redirection rollers 53 in each case form an angle of from 1° to 20° with respect to a straight line which extends parallel with the axis 37. It has been found to be advantageous, in particular in connection with four redirection rollers 53, for conventional strips 23 at an angle from 1° to 20°, when these strips 23 completely wrap around the redirection unit 29 at least once completely, not to come into contact with themselves. Furthermore, the position of the rotation axis of each redirection roller 53 of the four redirection rollers 53 can be adjusted with respect to the axis 37. The adjustable rotation axes of the redirection rollers 53 ensure that strips 23 with different geometries can be used. In particular, particularly depending on the width of a strip 23, the rotation axes of the redirection rollers 53 can be adjusted in such a manner that the strip 23 does not touch itself when the strip 23 wraps around the redirection unit 29 at least once completely.

Furthermore, the redirection unit 29 has a second input guiding element 55 and a pivot arm 57. The pivot arm 57 extends from the first end 59 thereof to the second end 61 thereof away from the axis 37. The second input guiding element 55 is fitted to the second end 61. Via the second input guiding element 55, the strip 23 can be supplied to the redirection unit 29. The second input guiding element 55 has four fourth redirection rollers 63 which are rotatably supported about the rotation axis thereof. The four fourth redirection rollers 63 are arranged in such a manner that a projection of the rotation axes onto a plane which is arranged perpendicularly to the path of the strip 23 forms a square. The strip 23 can consequently be guided using the fourth redirection rollers 63 in such a manner that a movement of the strip 23 in each direction perpendicular to the guiding direction of the strip 23 is limited by a fourth redirection roller 63. The fourth redirection rollers 63 which are arranged in such a manner consequently ensure a safe and reliable guiding of the strip 23. The use of fourth redirection rollers 63 is particularly advantageous since the fourth redirection rollers 63, in the event of contact with the strip 23, can thereby roll thereon and consequently friction losses resulting from friction between the strip 23 and the redirection unit 29 can be minimized.

Furthermore, the redirection unit 29 has a cylindrical element 65. The cylindrical element 65 extends from the crown-like element 49 to the additional crown-like element 51. The cylindrical element 65 is screwed at the first end thereof to the crown-like element 49 and screwed at the second end thereof to the additional crown-like element 51. The cylindrical element 65 has a wall which extends from the first end to the second end thereof and which is continuously closed so that between the crown-like element 49 and the additional crown-like element 51, the base unit 25 is continuously protected by the cylindrical element 65 with respect to the environment of the cylindrical element 65. The cylindrical element 65 forms a recess in which a portion of the base unit 25 is arranged. The cylindrical element 65 ensures that a relative movement between the base unit 25 and the redirection unit 29 at least between the crown-like element 49 and the additional crown-like element 51 cannot be reached from the environment of the cylindrical element 65 so that no objects, such as, for example, the strip 23, can be caught between the base unit 25 and the redirection unit 29.

The base unit 25 is securely coupled to the application unit 27. The fixed coupling between the base unit 25 and the application unit 27 ensures that the application unit 27 follows a movement of the base unit 25. Particularly when the base unit 25 is moved by means of the robot arm 11 of the robot apparatus 3, the application unit 27 follows this movement so that the strip 23 is applied to the workpiece 19 along a path which is defined by the movement of the base unit 25. In particular, the fixed coupling between the base unit 25 and the application unit 27 ensures that, when the base unit 25 is pivoted about the axis 37, the application unit 27 is pivoted together with the base unit 25 about the axis 37. The fixed coupling of the base unit 25 and the application unit 27 is provided at the second end 33 of the base unit 25. The application unit 27 is thus securely coupled to the base unit 25 at the second end 33 of the base unit 25. For the fixed coupling between the base unit 25 and the application unit 27, two coupling elements 67 are provided on the second end 33 of the base unit 25 and extend in each case away from the axis 37 to a free end 69 on which the application unit 27 is fitted.

The base unit 25 is coupled to the redirection unit 29 in such a manner that the base unit 25 and the redirection unit 29 can be pivoted relative to each other about the axis 37. The redirection unit 29 is thus coupled to the base unit 25 so as to be pivoted about the axis 37. This pivotable coupling between the base unit 25 and the redirection unit 29 ensures that, when the base unit 25 and consequently also the application unit 27 are pivoted about the axis 37, the redirection unit 29 is not pivoted about the axis 37 relative to the environment of the application apparatus 17, or at least irrespective of the pivot movement of the base unit 25 and the application unit 27 can be pivoted about the axis 37. Particularly when the application apparatus 17 is moved by means of the robot arm 11 of the robot apparatus 3, the redirection unit 29 follows this movement in the sense that the position of the redirection unit 29 together with the position of the base unit 25 and the position of the application unit 27 is changed, but the orientation of the redirection unit 29 can change irrespective of the orientation of the base unit 25 and the orientation of the application unit 27. Particularly when the orientation of the base unit 25 is changed and the orientation of the application unit 27 is changed, the orientation of the redirection unit 29 does not necessarily have to change. If the strip 23 is now applied to the workpiece 19, it may be necessary for the application unit 27 to change its orientation, for example, when the path along which the strip 23 is applied to the workpiece 19 forms a self-contained path, such as, for example, a rectangular path or a circular path. As a result of the fact that the redirection unit 29 is coupled to the base unit 25 so as to be able to be pivoted about the axis 37, during the movement of the application unit 27 in order to form the closed path, the redirection unit 29 can keep its orientation in particular with respect to the strip dispenser 5 constant or change it only minimally. As a result of the fact that the redirection unit 29 can keep its orientation with respect to the strip dispenser 5 constant or can change it only minimally, it is ensured that the strip 23 can be guided in such a manner that it can be received by the redirection unit 29 during the entire movement of the application unit 27 in order always to form the closed path in the same portion of the redirection unit 29. In particular, the strip 23, irrespective of the position and orientation of the application unit 27, can be received in the same portion of the redirection unit 29. This applies to any other conceivable form of the path, along which the strip 23 is applied to the workpiece 19.

Figure 9:
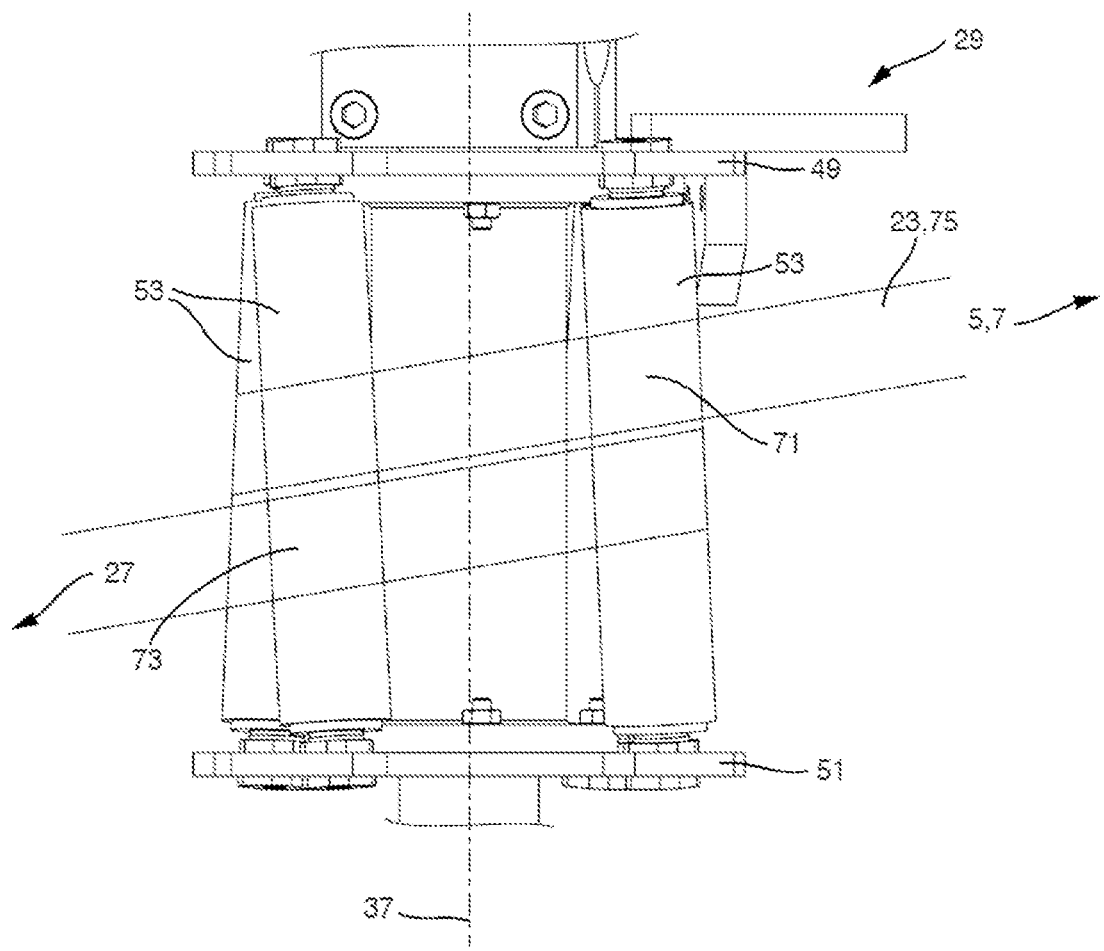
FIG. 9 shows a schematic view of a strip being guided about a redirection unit of a second embodiment of the application apparatus according to the invention of the production system in FIG. 1.

FIG. 9 shows a schematic view of the strip 23 being guided around the redirection unit 29 of a second embodiment of the application apparatus 17 according to the invention of the production system 1 in FIG. 1. The schematic view in FIG. 9 serves to illustrate and the features, technical effects and/or advantages described in connection with FIG. 9 also apply at least in a similar manner to the first embodiment of the application apparatus 17 according to the invention as illustrated in FIGS. 2 to 8. The features, technical effects and/or advantages described in connection with the first embodiment of the application apparatus 17 according to the invention as illustrated in FIGS. 2 to 8 also apply at least in a similar manner to the second embodiment of the application apparatus 17 according to the invention as illustrated in FIG. 9.

FIG. 9 schematically shows that the strip 23 wraps around the redirection unit 29. The strip 23 is guided in the production system 1 by the strip dispenser 5 and in particular the pretensioning device 7 to the application apparatus 17 and from there to the workpiece 19. Within the application apparatus 17, the strip 23 is initially guided to the redirection unit 29 and subsequently to the application unit 27. The redirection unit 29 has in order to guide the strip 23 the second input guiding element 55 which initially passes the strip 23 in such a manner that it is guided between the fourth redirection rollers 63. Subsequently, the strip 23 extends along the redirection rollers 53 of the redirection unit 29. In this instance, the strip 23 bears on the redirection rollers 53 and wraps around them. Subsequently, the strip is guided in such a manner that it passes the first input guiding element 41 in such a manner that it is guided between the first redirection rollers 43 of the first input guiding element 41. Subsequently, the strip 23 extends along the second redirection rollers 45 of the application unit 27 and is applied to the workpiece 19. In FIG. 9, the portion of the strip guiding which describes the guiding of the strip 23 around the redirection unit 29 is schematically illustrated. In FIG. 9, with the arrow which is denoted with the reference numerals 5 and 7, it is schematically illustrated that the strip 23 has passed the strip dispenser 5 and in particular the pretensioning device 7 before the strip 23 reaches the redirection unit 29 in the region of the reference numerals 5 and 7. With the arrow denoted with the reference numeral 27, it is illustrated that the strip 23, after it has passed the redirection unit 29, has reached the application unit 27. The path described in this instance is travelled by each portion of the strip 23 before the corresponding portion is applied to the workpiece 19. Preferably, the strip 23 extends from the strip dispenser 5 up to the workpiece 19 and, when the path of the strip 23 or the movement of the strip 23 is described by the production system, it is intended to be understood to mean that the strip 23 has portions which travel this path through the production system 1.

As illustrated in FIG. 9, the rotation axis of each third redirection roller 53 extends obliquely with respect to the axis 37. The position of the rotation axis of each third redirection roller 53 can be adjusted relative to the axis 37. The redirection unit 29 is configured as follows. The strip 23 wraps around the redirection unit 29 in such a manner that the strip 23 comes to bear on an axial receiving position 71 with the redirection unit 29. In the example illustrated in this instance, the strip 23 moves into abutment with the third redirection roller 53 illustrated at the front right. This abutment defines the axial receiving position 71. Furthermore, the strip 23 wraps around the redirection unit 29 in such a manner that the strip 23 is released from the redirection unit 29 at an axial discharge position 73. The location, at which the strip 23 is released from the redirection unit 29, defines the axial discharge position 73. The strip 23 is guided via the redirection unit 29 from the axial receiving position 71 to the axial discharge position 73. The axial receiving position 71 is spaced apart from the axial discharge position 73 in an axial direction of the axis 37. The spacing of the axial receiving position 71 from the axial discharge position 73 in an axial direction of the axis 37 ensures that, in the event of a movement of the application unit 27, the portion of the strip 23 between the strip dispenser 5 and the axial receiving position 71 does not touch the portion of the strip 23 between the axial discharge position 73 and the application unit 27. Furthermore, the first input guiding element 41 of the application unit 27 is spaced apart from the axial receiving position 71 in an axial direction of the axis 37. The spacing of the first input guiding element 41 from the axial receiving position 71 in an axial direction of the axis 37 ensures that, when the application unit 27 is pivoted relative to the redirection unit 29, the axial discharge position 73 can change in an axial direction, the axial discharge position 73 in this instance maintains an axial spacing from the axial receiving position 71.

Finally, it should be noted that FIGS. 2-4 and FIG. 6 illustrate a strip 23 which extends via the second redirection roller 45 which is illustrated in these figures at the lower edge of the image. In the examples illustrated in this instance, the strip 23 is a portion of a strip assembly 75 which has the strip 23 and a carrier 77. The strip 23 and the carrier 77 are connected to each other until the strip 23 is applied to the workpiece 19. The path of the strip 23 described above is travelled by the strip 23 whilst the strip 23 is connected to the carrier 77. In the region in which the strip 23 is applied to the workpiece 19, the strip 23 is released from the carrier 77. When viewed in the direction of the strip guiding, the strip 23 and the carrier 77 are connected to each other in front of the second redirection roller 45 illustrated at the lower edge of the image and, after the second redirection roller 45 illustrated at the lower edge of the image, the strip 23 and the carrier 77 are released from each other, wherein the strip 23 is applied to the workpiece 19 after the second redirection roller 45 illustrated at the lower edge of the image and the carrier 77 is guided by means of a part-quantity of the second redirection rollers 45 by the application unit 27. The example illustrated in this instance with the strip assembly 75 is purely exemplary. It is also conceivable for no carrier 77 to be provided and for the strip 23 to travel the path described above through the production system 1 without a carrier 77.

In addition, it should be noted that the term "having" does not exclude any other elements or steps and "a" or "one" does not exclude a large number. Furthermore, it should be noted that features which have been described with reference to one of the above exemplary embodiments can also be used in combination with other features of other exemplary embodiments described above. Reference numerals in the claims are not intended to be considered to be a limitation.

LIST OF REFERENCE NUMERALS

1 Production system
3 Robot apparatus
5 Strip dispenser
7 Pretensioning device
9 Frame
11 Robot arm
13 First end of the robot arm
15 Second end of the robot arm
17 Application apparatus
19 Workpiece
21 Workpiece rack
23 Strip
25 Base unit
27 Application unit
29 Redirection unit
31 First end of the base unit
33 Second end of the base unit
35 Connection device
37 Axis
39 Recess
41 First input guiding element
43 First redirection roller of the first input guiding element
45 Second redirection roller of the application unit
47 Plate element
49 Crown-like element
51 Additional crown-like element
53 Redirection roller of the redirection unit, third redirection roller
55 Second input guiding element
57 Pivot arm
59 First end of the pivot arm
61 Second end of the pivot arm
63 Fourth redirection roller of the second input guiding element
65 Cylindrical element
67 Coupling element
69 Free end of the coupling element
71 Axial receiving position
73 Axial discharge position
75 Strip assembly
77 Carrier

The invention claimed is:

1. An application apparatus, comprising:
a base unit comprising a first end, a second end, and a connection device, wherein the second end is remote from the first end, and the connection device extends along a base unit axis from the first end to the second end;
an application unit that is securely coupled to the second end of the base unit, wherein the application unit is configured to apply a strip to a workpiece; and
a redirection unit that is coupled to the base unit such that the redirection unit is pivotable about the base unit axis,
wherein the application unit comprises a first input guiding element, the first input guiding element configured to supply the strip to the application unit,
wherein the redirection unit is configured such that the strip can wrap around the redirection unit in a manner such that the strip can be guided from an axial receiving position to an axial discharge position, wherein the strip moves into abutment with the redirection unit in the axial receiving position and the strip is released from the redirection unit in the axial discharge position, and wherein the axial receiving position is spaced apart from the axial discharge position in an axial direction of the base unit axis, and
further wherein the first input guiding element of the application unit is spaced apart from the axial receiving position in the axial direction of the base unit axis.

2. The application apparatus according to claim 1, wherein the redirection unit further comprises a crown-like element and at least two redirection rollers, wherein each redirection roller is rotatably supported on the crown-like element, has a circumferential outer face and a rotation axis, and further wherein each redirection roller is configured to roll when the strip is guided on a portion of the strip by the redirection roller.

3. The application apparatus according to claim 2, wherein a position of the rotation axis of each redirection roller can be adjusted with respect to the base unit axis.

4. The application apparatus according to claim 2, wherein the rotation axis of each redirection roller extends obliquely relative to the base unit axis.

5. The application apparatus according to claim 4, wherein the rotation axis of each redirection roller forms an angle of from 1° to 20° with a straight line which extends parallel with the base unit axis.

6. The application apparatus according to claim 1, wherein the redirection unit further comprises a second input guiding element and a pivot arm, the pivot arm extending from a first end to a second end of the second input guiding element in a direction away from the base unit axis, and further wherein the second input guiding element is configured such that the strip can be supplied to the redirection unit at the second end of the second input guiding element.

7. The application apparatus according to claim 1, wherein the base unit further comprises a recess which extends from the first end of the base unit along the base unit axis to the second end of the base unit.

8. A robot apparatus, comprising:
a frame; and
a robot arm comprising a first robot arm end and a second robot arm end,
wherein the first robot arm end is coupled to the frame,
wherein the second robot arm end is coupled to the connection device at the first end of the base unit of the application apparatus according to claim 1, and
further wherein the second robot arm end comprises an actuator, the actuator configured such that the base unit can be pivoted about the base unit axis relative to the second robot arm end.

9. The robot apparatus according to claim 8, wherein the redirection unit further comprises a second input guiding element and a pivot arm, the pivot arm extending from a first end to a second end of the second input guiding element in a direction away from the base unit axis, and further wherein the second input guiding element is configured such that the strip can be supplied to the redirection unit at the second end of the second input guiding element.

10. The robot apparatus according to claim 8, wherein the base unit further comprises a recess which extends from the first end of the base unit along the base unit axis to the second end of the base unit.

11. The robot apparatus according to claim 8, wherein the redirection unit further comprises a crown-like element and at least two redirection rollers, wherein each redirection roller is rotatably supported on the crown-like element, has a circumferential outer face and a rotation axis, and further wherein each redirection roller is configured to roll when the strip is guided on a portion of the strip by the redirection roller.

12. The robot apparatus according to claim 11, wherein the rotation axis of each redirection roller extends obliquely relative to the base unit axis.

13. The robot apparatus according to claim 12, wherein a position of the rotation axis of each redirection roller can be adjusted with respect to the base unit axis.

14. A production system, comprising:
a robot apparatus that comprises:
a frame; and
a robot arm comprising a first robot arm end and a second robot arm end,
wherein the first robot arm end is coupled to the frame,
wherein the second robot arm end is coupled to a connection device at the first end of the base unit of the application apparatus according to claim 1, and
further wherein the second robot arm end comprises an actuator, the actuator configured such that the base unit can be pivoted about the base unit axis relative to the second robot arm end; and
a strip dispenser having a pretensioning apparatus, wherein, when the strip is supplied to the application apparatus, a portion of the strip is pretensioned by the pretensioning device in such a manner that a pretensioning force which is greater than a predetermined pretensioning force threshold acts along the strip.

15. The production system according to claim 14, wherein the redirection unit further comprises a second input guiding element and a pivot arm, the pivot arm extending from a first end to a second end of the second input guiding element in a direction away from the base unit axis, and further wherein the second input guiding element is configured such that the strip can be supplied to the redirection unit at the second end of the second input guiding element.

16. The production system according to claim 14, wherein the base unit further comprises a recess which extends from the first end of the base unit along the base unit axis to the second end of the base unit.

17. The production system according to claim 14, wherein the redirection unit further comprises a crown-like element and at least two redirection rollers, wherein each redirection roller is rotatably supported on the crown-like element, has a circumferential outer face and a rotation axis, and further wherein each redirection roller is configured to roll when the strip is guided on a portion of the strip by the redirection roller.

18. The production system according to claim 17, wherein the rotation axis of each redirection roller extends obliquely relative to the base unit axis.

19. The production system according to claim 18, wherein a position of the rotation axis of each redirection roller can be adjusted with respect to the base unit axis.

* * * * *